United States Patent
Yu et al.

(10) Patent No.: US 7,792,226 B2
(45) Date of Patent: Sep. 7, 2010

(54) METHOD AND APPARATUS FOR CARRIER POWER AND INTERFERENCE-NOISE ESTIMATION IN SPACE DIVISION MULTIPLE ACCESS AND MULTIPLE-INPUT/MULTIPLE-OUTPUT WIRELESS COMMUNICATION SYSTEMS

(75) Inventors: Xiaoyong Yu, Grayslake, IL (US); Jian J. Wu, Reading (GB)

(73) Assignee: Motorola, Inc., Schaumburg, IL (US)

( * ) Notice: Subject to any disclaimer, the term of this patent is extended or adjusted under 35 U.S.C. 154(b) by 558 days.

(21) Appl. No.: 11/839,759

(22) Filed: Aug. 16, 2007

(65) Prior Publication Data

US 2009/0046772 A1    Feb. 19, 2009

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. .................. 375/346; 375/224; 375/285
(58) Field of Classification Search .............. 375/224, 375/227, 285, 340, 346, 348, 350; 370/241, 370/252
See application file for complete search history.

(56) References Cited

U.S. PATENT DOCUMENTS

| | | | |
|---|---|---|---|
| 7,177,378 B2 * | 2/2007 | Baldemair et al. | 375/348 |
| 7,532,868 B1 * | 5/2009 | Sapozhnykov et al. | 455/127.1 |
| 7,577,187 B2 * | 8/2009 | Bui | 375/148 |
| 7,606,299 B2 * | 10/2009 | Chang et al. | 375/227 |
| 2005/0069060 A1 * | 3/2005 | Saito | 375/341 |
| 2006/0093074 A1 | 5/2006 | Chang et al. | |
| 2007/0049214 A1 | 3/2007 | Song | |
| 2007/0058603 A1 | 3/2007 | Song et al. | |
| 2008/0075158 A1 * | 3/2008 | Li | 375/232 |

FOREIGN PATENT DOCUMENTS

WO    2007021159 A2    2/2007

* cited by examiner

Primary Examiner—Jean B Corrielus

(57) ABSTRACT

Estimates of carrier signal power S and interference-noise NI at the output of the equalizer in a wireless communication system is obtained by (i) determining the variance, $\sigma_Z^2$, of the noise at the output of the equalizer dependent upon the equalization matrix, $W^H$ and an estimate of the variance $\sigma^2$ of the noise at the receiving antennas, (ii) determining the interference, $\sigma_I^2$, at the output of the equalizer dependent upon the equalization matrix, $W^H$, a transfer function matrix, H, of transmission paths between transmitting antennas and receiving antennas, and an estimate $\sigma_X^2$ of the variance of the transmitted signals and (iii) determining the power, S, of the carrier signal at the output of the equalizer dependent upon $W^H$, H and $\sigma_X^2$. The estimate of the interference-noise NI is calculated as $NI=\sigma_I^2+\sigma_Z^2$. These values may be used to facilitate adaptation of the wireless communication system.

20 Claims, 3 Drawing Sheets

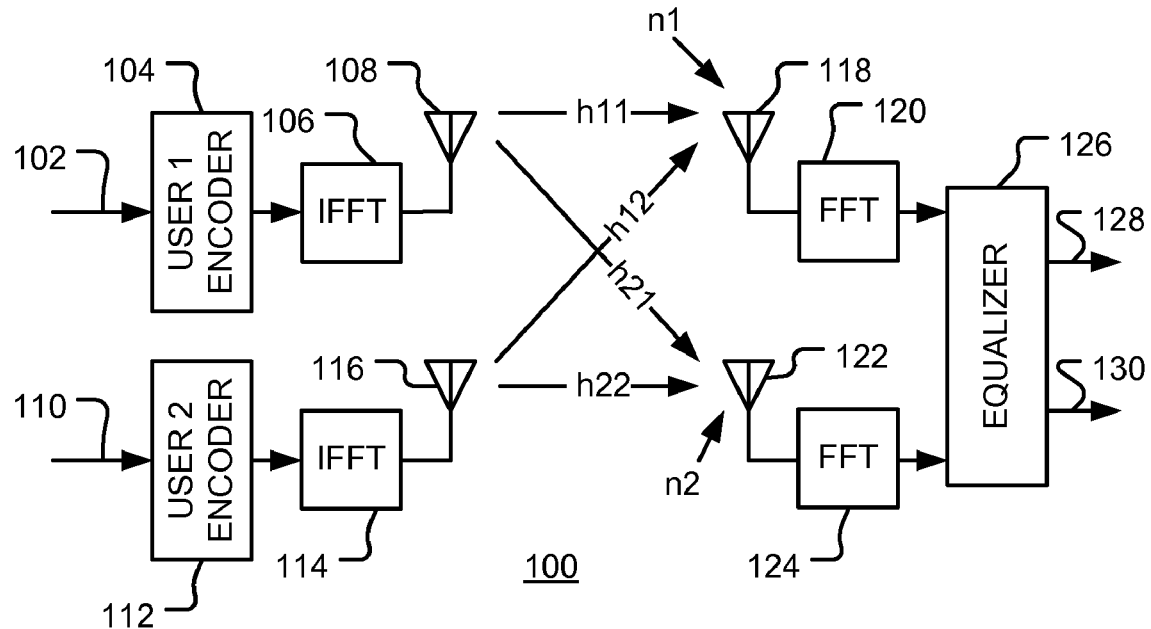
*FIG. 1*
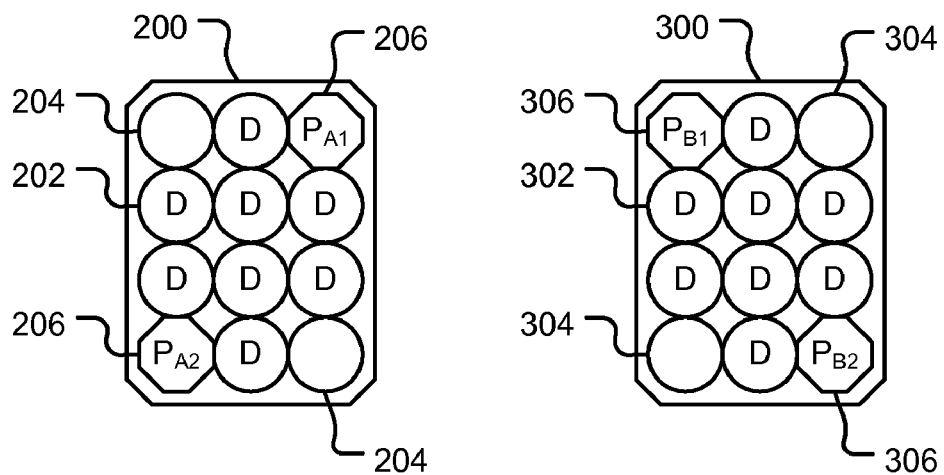
*FIG. 2*  *FIG. 3*

METHOD AND APPARATUS FOR CARRIER POWER AND INTERFERENCE-NOISE ESTIMATION IN SPACE DIVISION MULTIPLE ACCESS AND MULTIPLE-INPUT/MULTIPLE-OUTPUT WIRELESS COMMUNICATION SYSTEMS

BACKGROUND

In order to manage radio resources efficiently in a broadband wireless access network, the characteristics of the wireless link are adapted. Link adaptation relies upon receiver channel condition measurements such as carrier to interference-noise ratio (CINR), received signal strength indicator (RSSI), noise and interference levels, instantaneous capacity, a number of retries and a number of packets lost. In particular, an accurate estimate of the carrier to interference-noise ratio (CINR) is required. This estimate allows radio signal strengths to be controlled.

In the Institute of Electrical and Electronic Engineers (IEEE) 802.16 Broadband Wireless Access standards for communication networks (also known as "WiMAX"), the carrier to interference-noise ratio (CINR) is an important air interface condition indicator that is used for resource management of the Physical Layer of the network, and CINR estimates are mandated for network base stations. The WiMAX specification recommends that the CINR be calculated as $$CINR_k = \frac{\sum_{n=0}^{N-1} |s_{k,n}|^2}{\sum_{n=0}^{N-1} |r_{k,n} - s_{k,n}|^2}, \quad (1)$$

where $r_{k,n}$ is the received sample n within signal k; $s_{k,n}$ represents a detected or pilot sample with channel state weighting; and N is the number of samples used in the estimate. It is also stated in the WiMAX specification that the estimate should be accurate to within +/−2 dB.

This CINR estimation method is suitable for multiple receive antennas that use maximum ratio combining (MRC) or non-SDMA (space division multiple access) systems. In these applications, the CINR for each antenna is calculated separately then added up to form a total signal quality indicator. However, in case of SDMA or MIMO (multiple-input/multiple-output) systems, this estimate is no longer valid, because antenna beam-forming or MIMO equalizer results in some interference cancellation. In these systems, the effective interference seen in the output of a MIMO equalizer or a beam-former is not a summation of interference on each antenna.

It has been noted that the traditionally estimated interference-plus-noise, used for MCS (modulation code scheme) selection in a MIMO and SDMA Scheduler, should be offset by a value, due to interference seen in decoder has been changed after beam-forming. However, no methods have been disclosed for determining the offset value. In order to manage radio resource efficiently, a more accurate CINR estimate is required when an antenna beam-former or a MIMO equalizer is employed in base station or subscriber station.

BRIEF DESCRIPTION OF THE FIGURES

The accompanying figures, in which like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 is a simplified diagram of an exemplary communication system in accordance with some embodiments of the invention.

FIG. 2 and FIG. 3 show the tile structures used in PUSC (partial usage of sub-channels) mode.

Figure 4:
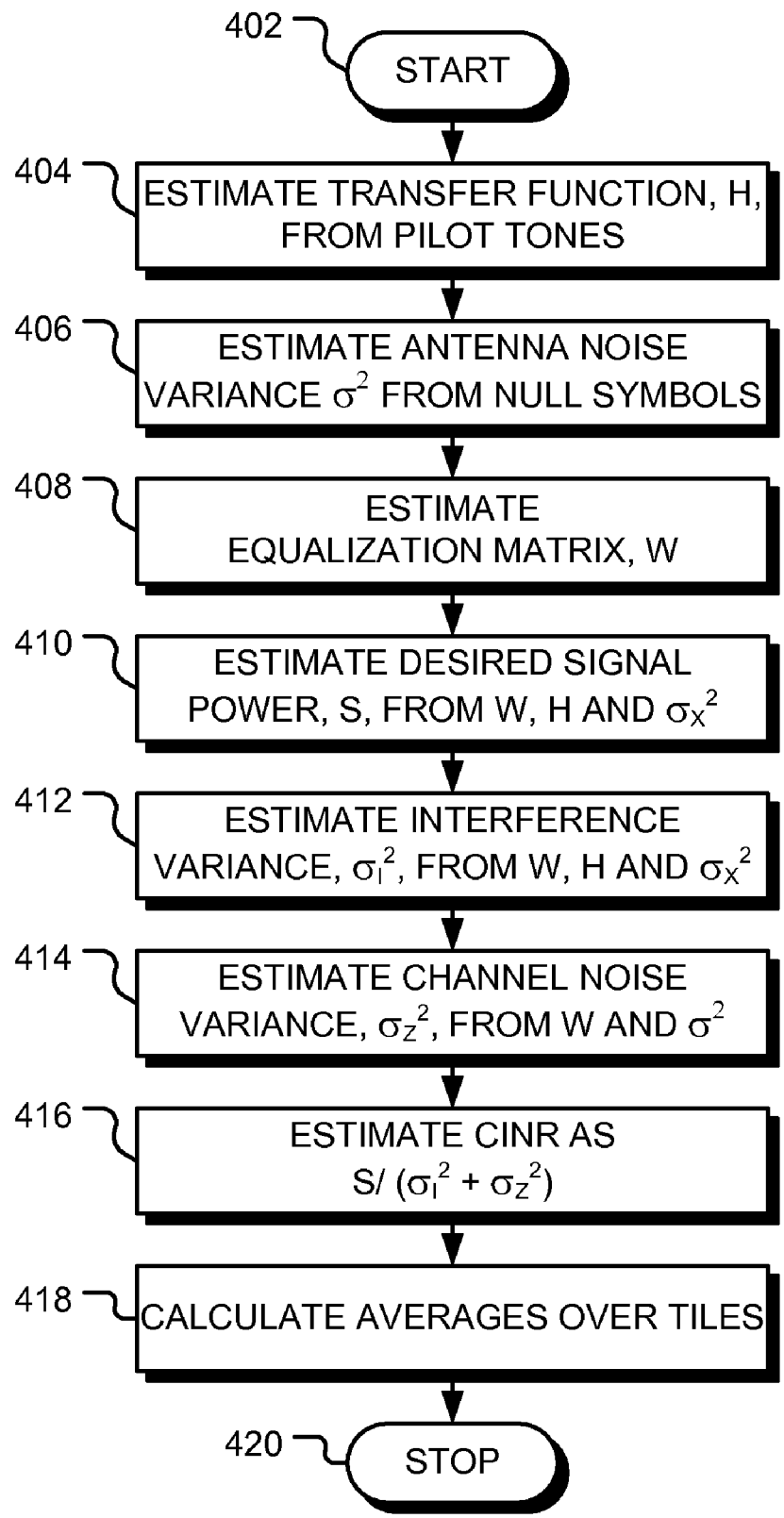
FIG. 4 is a flow chart of a method for estimating the CINR in a wireless communication system in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to carrier to interference-noise ratio (CINR) estimation. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may comprise one or more conventional processors and unique stored program instructions that control the one or more processors to implement, in conjunction with certain non-processor circuits, some, most, or all of the functions of carrier to interference-noise ratio (CINR) estimation described herein. The non-processor circuits may include, but are not limited to, radio receivers, radio transmitters, signal drivers, clock circuits, power source circuits, and user input devices. As such, these functions may be interpreted as a method to perform CINR estimation. Some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In what follows, an example of an up-link (UL) space division multiple access (SDMA) system with a minimum mean square error (MMSE) equalizer will be described as an exemplary embodiment of the invention. However, it will be apparent to those of ordinary skill in the art that the present invention has other applications in wireless communication systems.

FIG. 1 is a simplified diagram of an exemplary communication system, 100. Symbols 102 from a first subscriber are encoded in encoder 104 and the encoded symbols passed through an inverse Fourier transform unit 106. The unit 106 may perform an inverse fast Fourier transform (IFFT). The output from the unit 106 comprises a number of tonal signals that are modulated and passed to an antenna 108 for transmission. Similarly, data 110 from a second subscriber is encoded in encoder 112 and the encoded symbols passed through an inverse Fourier transform unit 114. The output from the unit 114 comprises a number of tonal signals that are modulated and passed to an antenna 116 for transmission.

The signal from antenna 108 propagates over a signal path with characteristic $h_{11}$ to the first antenna 118 of a receiving station. The receiving station may be a base station or network access point. However, in other embodiments of the present invention, the receiving station may be a mobile subscriber station that receives signals from multiple sources. The received signal is passed through Fourier transform unit 120 (which may be a fast Fourier transform (FFT) unit) to obtain the frequency components of the signal. The signal also propagates over a signal path with characteristic $h_{21}$ to the second antenna 122 of the receiving station. The signal received by the second antenna 122 is passed through Fourier transform unit 124 to obtain the frequency components of the signal.

The signal from antenna 116 propagates over a signal path with characteristic $h_{12}$ to the first antenna 118 of the receiving station. The received signal is passed through Fourier transform unit 124 to obtain the frequency components of the signal. The signal also propagates over a signal path with characteristic $h_{22}$ to the second antenna 122 of the receiving station. The signal received by the second antenna 122 is passed through Fourier transform unit 124 to obtain the frequency components of the signal.

Equalizer 126 is applied to the frequency components of the signals received by antennas 118 and 122 to obtain estimates 128 and 130 for the signals transmitted by the two users. These estimates are then processed further to recover the original symbols. Since SDMA is used, the signals from the users share the same frequency band and interfere with one another. One role of the equalizer 126 is to cancel this interference. However, the antennas 118 and 122 are also subject to noise, denoted by the signals n1 and n2 in FIG. 1, which prevents perfect equalization.

The CINR of the signals 128 and 130 output from the equalizer is dependent upon the characteristics of the equalizer. However, equalizer characteristics are not used in prior CINR estimation methods.

In one embodiment of the invention, the signals are transmitted using orthogonal frequency division multiplexing (OFDM). In this approach each user channel comprises a cluster of frequency bands, called sub-channels. Each OFDM symbol is encoded into the sub-channels.

FIG. 2 and FIG. 3 show the tile structures used in PUSC (partial usage of sub-channels) mode. In FIG. 2 and FIG. 3, four sub-carriers are used. Each column of the tile corresponds to a symbol or time interval, while each row of tile corresponds to a sub-carrier or frequency. FIG. 2 shows a tile 200 for user 1. The tile 200 is arranged in a first pattern that includes a number of data symbols 202, denoted by the circles labeled 'D', two null symbols 204, and two pilot symbols 206, denoted by the circles labeled 'P.' Similarly, FIG. 3 shows a tile 300 for user 2. The tile 300 is arranged in a second pattern that includes a number of data symbols 302, denoted by the circles labeled 'D', two null symbols 304, and two pilot symbols 306 denoted by the circles labeled 'P.' The pilot symbols are orthogonal for the first and second patterns. The two users with these tile patterns are paired together to share the same uplink (UL) resource that is composed of frequency bandwidth and time interval.

In the following description, two receive antennas are assumed for simplicity. After removal of the cyclic prefix (CP) and Fourier transformation, the signals received on antennas 118 and 122 can be expressed as $$\begin{cases} Y_1 = H_{1,1} X_1 + H_{1,2} X_2 + N_1 \\ Y_2 = H_{2,1} X_1 + H_{2,2} X_2 + N_2, \end{cases} \quad (2)$$

where $Y_1$ and $Y_2$ are received signals on antenna 1 (118 in FIG. 1) and antenna 2 (122 in FIG. 1), respectively; $X_1$ and $X_2$ represent the transmitted signals of user 1 and user 2, respectively; $N_1$ and $N_2$ are additive white Gaussian noise for antennas 1 and 2; and $H_{1,1}$, $H_{2,1}$, $H_{1,2}$ and $H_{2,2}$ denote the Fourier transforms of the channel characteristics $h_{11}$, $h_{21}$, $h_{12}$, and $h_{21}$.

The transmitted signals $X_1$ and $X_2$ may be estimated by applying an equalizer to the received signals, $Y_1$ and $Y_2$. The received signal vector is given by Y=HX+N. The equalizer matrix that yields the minimum mean square error is $$W^H = (H^H H + \sigma^2 I)^{-1} H^H, \quad (3)$$

where the superposed 'H' denotes the conjugate transpose, I is the identity matrix, the channel transfer function H is given by $$H = \begin{bmatrix} H_{1,1} & H_{1,2} \\ H_{2,1} & H_{2,2} \end{bmatrix}, \quad (4)$$

and $\sigma^2$ is noise variance, i.e., $\sigma^2 = \text{var}(N_1) = \text{var}(N_2)$. The equalized signal vector for user 1 and user 2 is given as $$U = W^H Y = \begin{bmatrix} w_{1,1}^* & w_{2,1}^* \\ w_{1,2}^* & w_{2,2}^* \end{bmatrix} \times \begin{bmatrix} H_{1,1} X_1 + H_{1,2} X_2 + N_1 \\ H_{2,1} X_1 + H_{2,2} X_2 + N_2 \end{bmatrix}. \quad (5)$$

The signal of user 1 that is fed into a corresponding channel decoder can be expressed as $$U_1 = [W^H H]_{1,1} X_1 + [W^H H]_{1,2} X_2 + [W^H N]_1 \quad (6)$$

$$= \underbrace{(w_{1,1}^* H_{1,1} + w_{2,1}^* H_{2,1}) X_1}_{\text{desired signal}} +$$

$$\underbrace{(w_{1,1}^* H_{1,2} + w_{2,1}^* H_{2,2}) X_2}_{\text{interference}} + \underbrace{Z_1}_{AWGN}.$$

The variance of the additive noise in the output from the equalizer is $$\sigma_{Z_1}^2 = (|w_{1,1}|^2 + |w_{2,1}|^2) \sigma^2$$

and the interference variance can be determined as $$\sigma_{I_1}^2 = |[W^H H]_{1,2}|^2 \sigma_X^2 = |w_{1,1}^* H_{1,2} + w_{2,1}^* H_{2,2}|^2 \sigma_X^2. \quad (7)$$

Here, $\sigma_X^2$ is the variance of the transmitted signal. For example, $\sigma_X^2 = 1$ for a normalized QAM (quadrature amplitude modulation) constellation. The effective interference plus noise seen at the channel decoder for user 1 within in a tile is $$NI_{t,1} = |w_{1,1}^* H_{1,2} + w_{2,1}^* H_{2,2}|^2 \sigma_X^2 + (|w_{1,1}|^2 + |w_{2,1}|^2) \sigma^2.$$

The equalized carrier signal power for user 1 within in a tile is $$S_{t,1} = |[W^H H]_{1,1}|^2 \sigma_X^2 = |w_{1,1}^* H_{1,1} + w_{2,1}^* H_{2,1}|^2 \sigma_X^2 \quad (8)$$

Consequently, the effective CINR of user 1 within a tile is $$CINR_{t,1} = \frac{S_{t,1}}{NI_{t,1}} \quad (9)$$

$$= \frac{|w_{1,1}^* H_{1,1} + w_{2,1}^* H_{2,1}|^2 \sigma_X^2}{|w_{1,1}^* H_{1,2} + w_{2,1}^* H_{2,2}|^2 \sigma_X^2 + (|w_{1,1}|^2 + |w_{2,1}|^2) \sigma^2}.$$

Practically speaking, channel estimate can be calculated using the pilot symbols. For example, $H_{1,1}, H_{2,1}, H_{1,2}$ and $H_{2,2}$ maybe estimated as follows $$\hat{H}_{1,1} = \frac{1}{2} \left( \frac{Y_1^{A,1}}{P_{A,1}} + \frac{Y_1^{A,2}}{P_{A,2}} \right) \quad (10)$$

$$\hat{H}_{2,1} = \frac{1}{2} \left( \frac{Y_2^{A,1}}{P_{A,1}} + \frac{Y_2^{A,2}}{P_{A,2}} \right) \quad (11)$$

$$\hat{H}_{1,2} = \frac{1}{2} \left( \frac{Y_1^{B,1}}{P_{B,1}} + \frac{Y_1^{B,2}}{P_{B,2}} \right) \quad (12)$$

-continued $$\hat{H}_{2,2} = \frac{1}{2} \left( \frac{Y_2^{B,1}}{P_{B,1}} + \frac{Y_2^{B,2}}{P_{B,2}} \right) \quad (13)$$

where the superscript of $Y_1$ and $Y_2$ indicates received pilot symbol position in a tile, for example $Y_1^{A,1}$ means received pilot 1 in tile pattern A on antenna 1. In general, $$\hat{H}_{a,u} = \frac{1}{2} \left( \frac{Y_a^{u,1}}{P_{u,1}} + \frac{Y_a^{u,2}}{P_{u,2}} \right),$$

where $Y_a^{u,s}$ denotes the received signal from antenna a for pilot s in the PUSC (partial usage sub-channel) tile pattern u and $P_{u,s}$ denotes the pilot s in the PUSC tile pattern u.

Similarly, the CINR of user 2 within a tile is $$CINR_{t,2} = \frac{S_{t,2}}{NI_{t,2}} \quad (14)$$

$$= \frac{|w_{1,2}^* H_{1,2} + w_{2,2}^* H_{2,2}|^2 \sigma_X^2}{|w_{1,2}^* H_{1,1} + w_{2,2}^* H_{2,1}|^2 \sigma_X^2 + (|w_{1,2}|^2 + |w_{2,2}|^2) \sigma^2}$$

Final, the CINR estimate is averaged over all tiles, that is, $$CINR_1 = \frac{1}{T} \sum_{t=1}^{T} CINR_{t,1} \text{ and } CINR_2 = \frac{1}{T} \sum_{t=1}^{T} CINR_{t,2} \quad (15)$$

for users 1 and 2, respectively, where T is number of tiles for each user.

The CINR estimate may be used for adaptation of the wireless links. In some applications, effective signal power S and interference noise power NI are used separately for radio source management. Therefore it is desired to report the two measurements independently instead of in a value of ratio. They are calculated as $$S_1 = \frac{1}{T} \sum_{t=1}^{T} S_{t,1}, S_2 = \frac{1}{T} \sum_{t=1}^{T} S_{t,2}, \quad (16)$$

$$NI_1 = \frac{1}{T} \sum_{t=1}^{T} NI_{t,1} \text{ and } NI_2 = \frac{1}{T} \sum_{t=1}^{T} NI_{t,2}$$

where $S_1$ and $NI_1$ are the signal and interference noise power for user 1 and $S_2$ and $NI_2$ are the signal and interference noise power for user 2. For example, one benefit of reporting individual S and NI estimates is RSSI determination in addition to CINR, where RSSI=S+NI while CINR=S/NI.

FIG. 4 is a flow chart of a method for estimating the CINR for a user, such as user 1, in a wireless communication system. Following start block 402 in FIG. 4, the transfer function H is estimated at block 404 from the pilot tones as described in equations (10)-(13) above. At block 406, the noise variance $\sigma^2$ at each antenna is estimated from the null symbols. At block 408, the equalization matrix W is calculated from H and $\sigma^2$ using equation (3) above. At block 410, the desired signal power of user 1 within a tile is calculated from H, W, and the signal variance $\sigma_X^2$ as $S_{t,1}=|(w_{1,1}^*H_{1,1}+w_{2,1}^*H_{2,1})|^2\sigma_X^2$. At block 412, the interference variance of user 1 within a tile is calculated from H, W and $\sigma_X^2$ as $\sigma_{I_1}^2=|(w_{1,1}^*H_{1,2}+w_{2,1}^*H_{2,2})|^2\sigma_X^2$. At block 414 the channel noise variance of user 1 within a tile is calculated from W and $\sigma^2$ as $\sigma_{Z_1}^2=(|w_{1,1}|^2+|w_{2,1}|^2)\sigma^2$. Finally, at block 416, the carrier to interference-noise ratio (CINR) of user 1 within a tile is calculated as $$CINR_{t,1}=\frac{S_{t,1}}{NI_{t,1}}=\frac{S_{t,1}}{\sigma_{Z_1}^2+\sigma_{I_1}^2},$$

in accordance with equation (9) above. Optionally, at block 418, the values of CINR1, $S_1$, and/or $NI_1$ may be calculated over all tiles for the user. The method terminates at block 420.

Calculation of the CINR for other users can be performed in a corresponding manner.

Thus, the estimate of carrier to interference-noise ratio (CINR) at the output of the equalizer in a wireless communication system is obtained by (i) determining the variance, $\sigma_{Z_1}^2$ and $\sigma_{Z_2}^2$, of the noise at the output of the equalizer dependent upon the equalization matrix $W^H$ and an estimate of the variance $\sigma^2$ of the noise at the receiving antennas, (ii) determining the interference power, $\sigma_{I_1}^2$ and $\sigma_{I_2}^2$, at the output of the equalizer dependent upon the equalization matrix $W^H$, a transfer function matrix H of transmission paths between a plurality of transmitting antennas and the plurality of receiving antennas, and a known value $\sigma_X^2$ of the variance of the signals transmitted from the transmitting antennas and (iii) determining the desired signal power, $S_1$ and $S_2$, of the signal at the output of the equalizer dependent upon the equalization matrix $W^H$, the transfer function matrix H, and the known value $\sigma_X^2$ of the variance of the signal at the transmitting antennas. The estimate of carrier to interference-noise ratio (CINR) is calculated as $CINR_1=S_1/(\sigma_{Z_1}^2+\sigma_{I_1}^2)$ and $CINR_2=S_2/(\sigma_{Z_2}^2+\sigma_{I_2}^2)$ that are averaged over all tiles per user. This CINR or independent S and NI values is outputted to facilitate adaptation of wireless communication system.

Figure 5:
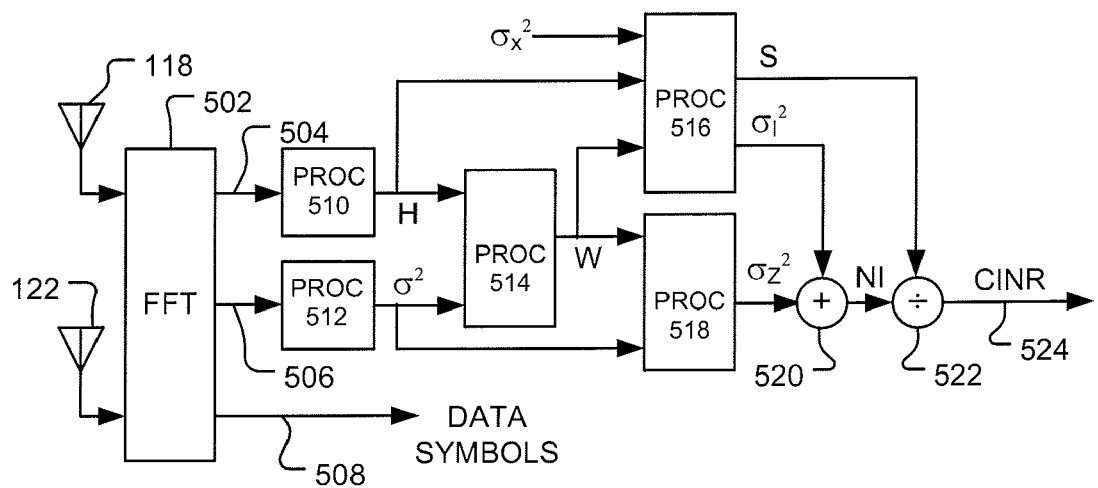
FIG. 5 is a block diagram of system for estimating CINR in accordance with some embodiments of the present invention.

FIG. 5 is a block diagram of a system for estimating CINR in accordance with some embodiments of the present invention. Referring to FIG. 5, antennas 118 and 112 receive transmitted signals. The cyclic prefix is removed and the signals are passed to a processing element 502 which performs a Fourier transform to obtain the frequency components of the signals and also decodes the corresponding symbols. As shown in FIG. 2 and FIG. 3 discussed above, some of the frequency components correspond to pilot tones 504 in some time slots and to null symbols 506 in other time slots. Other frequency components correspond to data symbols 508. The pilot tones 504 (which include the frequency components Y and the corresponding symbols P) are passed to a third processing unit 510 and used to determine the transfer function matrix H. The frequency components 506 corresponding to null symbols are passed to a fourth processing unit 512 and used to generate estimates, $\sigma^2$, of the antenna noise variance. The transfer function matrix H and the noise variance estimate $\sigma^2$ are then used by a fifth processing unit 514 to determine the equalization matrix W, using a MMSE technique for example. The equalization matrix W and transfer function matrix H are then used in a first processing unit 516, along with known value $\sigma_X^2$ of the variance of the signals transmitted from the transmitting antennas, to determine the signal power estimate, S, and the interference variance, $\sigma_I^2$. The equalization matrix W and the antenna noise variance estimate $\sigma^2$ are used in a second processing unit 518 to determine the estimated channel noise variance, $\sigma_Z^2$. Finally, the channel noise variance estimate $\sigma_Z^2$ and the interference variance $\sigma_I^2$ are summed at a summing unit 520 and divided into the signal power estimate S at a division unit 522 to give the CINR estimate 524.

The first processing unit 516 is operable to produce an estimate, S, of the power of the signal at the output of the equalizer dependent upon the equalization matrix $W^H$, a transfer function matrix H between the transmitting antennas and the receiving antennas, and the known value $\sigma_X^2$ of the transmitted signal and further is operable to produce the estimate, $\sigma_I^2$, of the variance of the interference at the output of the equalizer dependent upon the equalization matrix $W^H$, the transfer function matrix H, and the variance $\sigma_X^2$ of the transmitted signal.

The second processing unit 518 is operable to generate an estimate, $\sigma_Z^2$, of the variance of the noise at the output of the equalizer dependent upon the equalization matrix $W^H$ and an estimate of the variance $\sigma^2$ of the noise at the receiving antennas.

The summing unit 520 is operable to sum the estimate, $\sigma_I^2$, of the variance of the interference and the estimate, $\sigma_Z^2$, of the variance of the noise at the output of the equalizer, and the division unit 522 is operable to produce the CINR by dividing the estimate, S, of the power of the signal at the output of the equalizer by the sum the estimate, $\sigma_I^2$, of the variance of the interference and the estimate, $\sigma_Z^2$, of the variance of the noise at the output of the equalizer.

The third processing unit 510 is operable to receive pilot tone symbols and corresponding sub-channel components 504 from the receiving antennas and to generate, therefrom, the transfer function matrix H between the transmitting antennas and the receiving antennas.

The fourth processing unit 512 is operable to receive sub-channel components corresponding to null symbols from the receiving antennas and is operable to generate, therefrom, the antenna noise variance estimate $\sigma^2$. The fifth processing unit 514 is coupled to the processing units 510 and 512 and is operable to generate the equalization matrix $W^H$ dependent the transfer function matrix H and the antenna noise variance estimate $\sigma^2$.

The processing units may be implemented, for example, on a programmed processor such as a computer microprocessor or a digital signal processor. Alternatively, the processing elements may be implemented using custom integrated circuits or programmable logic circuits (such as field programmable gate arrays). Other embodiments, including combinations of the aforementioned embodiments, will be apparent to those of ordinary skill in the art.

The CINR may be estimated by a subscriber station, an intermediate station, or a base station. The estimated CINR may be passed to other nodes in a network.

In contrast to the method described above, if the guidance of the IEEE WiMAX specification were followed, the carrier to interference-noise ratio of user 1 would be calculated as follows (assuming channel estimate is performed on tile basis):

$$CINR_{spec} = \frac{\sum \begin{pmatrix} |\hat{H}_{1,1}P_{A,1}|^2 + |\hat{H}_{1,1}P_{A,2}|^2 + \\ |\hat{H}_{2,1}P_{A,1}|^2 + |\hat{H}_{2,1}P_{A,2}|^2 \end{pmatrix}}{\sum \begin{pmatrix} |Y_1^{A,1} - \hat{H}_{1,1}P_{A,1}|^2 + |Y_1^{A,2} - \hat{H}_{1,1}P_{A,2}|^2 + \\ |Y_1^{A,2} - \hat{H}_{2,1}P_{A,1}|^2 + |Y_1^{A,2} - \hat{H}_{2,1}P_{A,2}|^2 \end{pmatrix}} \quad (17)$$

In general, this is a poor estimate for MIMO and SDMA systems. In particular, this estimate is not dependent upon the characteristic $W^H$ of the equalizer.

If the number of receiving antennas is M, the CINR estimate per tile for user 1 can be written as $$CINR_{t,1} = \frac{\left|\sum_{m=1}^{M} w_{m,1}^* H_{m,1}\right|^2 \sigma_X^2}{\left|\sum_{m=1}^{M} w_{m,1}^* H_{m,2}\right|^2 \sigma_X^2 + \sigma^2 \sum_{m=1}^{M} |w_{m,1}^*|^2} \quad (18)$$

The equivalent equation for user 2 can be derived in a similar manner.

It will be apparent to those of ordinary skill in the art that the method above may be modified for applications where the receiving antennas have different noise levels. In these cases, the equalization matrix is $$W^H = (H^H H + \text{diag}\{\sigma_m^2\})^{-1} H^H, \quad (19)$$

where $\sigma_m^2$ is the noise variance at receiving antenna m and diag denotes a diagonal matrix. Similarly, the channel noise variance for user u is $$\sigma_{Z_u}^2 = \sum_{m=1}^{M} |w_{m,u}|^2 \sigma_m^2.$$

Figure 6:
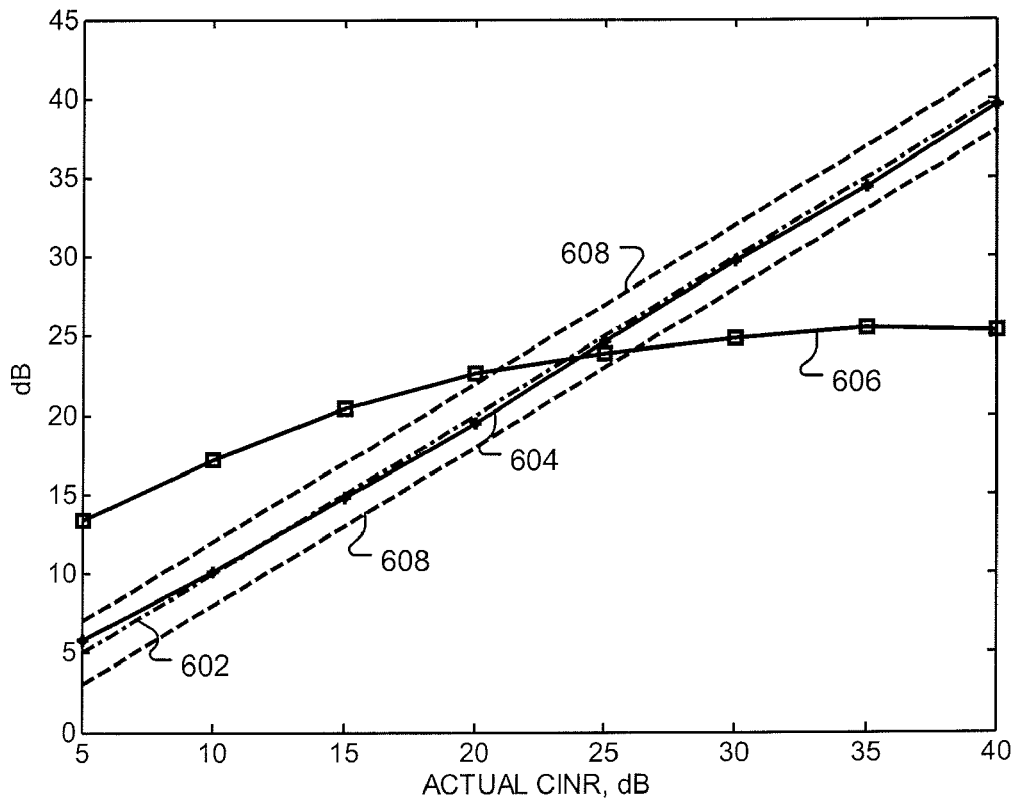
FIG. 6 is a graphical comparison of CINR estimates.

FIG. 6 shows a plot of true CINR values (broken line 602) for an exemplary system together with an estimate (line 604) of the CINR obtained using the method of the present invention and a further estimate (line 606) of the CINR obtained using the method given in the WiMAX specification. In this example, the estimate derived as recommended in the WiMAX specification is very poor. This is because the method was designed for systems that do not utilize SDMA. In contrast, the method of the present invention provides a CINR estimate that is in good agreement with true values. The broken lines 608 indicate error bars that are +/−2 dB from the true CINR. The method of the present invention produces estimates well within 2 dB of the true value, while the estimate derived as recommended in the WiMAX specification is often in error by much more than 2 dB.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for generating an estimate of carrier signal power S and interference-noise NI at the output of an equalizer in a wireless communication system, the equalizer being characterized by an equalization matrix, $W^H$, and receiving signals from a plurality of receiving antennas, the method comprising:
    determining a variance, $\sigma_Z^2$, of the noise at the output of the equalizer dependent upon the equalization matrix, $W^H$, and an estimate of a variance $\sigma^2$ of the noise at the receiving antennas;
    determining a variance of an interference power, $\sigma_I^2$, at the output of the equalizer dependent upon the equalization matrix, $W^H$, a transfer function matrix, H, of transmission paths between a plurality of transmitting antennas and the plurality of receiving antennas, and a variance $\sigma_X^2$ of the signals transmitted from the transmitting antennas;
    determining the power, S, of the carrier signal at the output of the equalizer dependent upon the equalization matrix, $W^H$, the transfer function matrix, H, and the variance $\sigma_X^2$ of the signals transmitted from the transmitting antennas;
    determining an estimated interference-noise as NI=$\sigma_I^2$+$\sigma_Z^2$; and
    outputting at least one value derived from the carrier signal power S and interference noise NI to facilitate adaptation of the wireless communication system.

2. A method in accordance with claim 1, further comprising determining the estimated interference-noise (CINR) as CINR=S/NI, wherein outputting at least one value derived from the carrier signal power S and interference noise NI to facilitate adaptation of the wireless communication system comprises outputting the estimated CINR.

3. A method in accordance with claim 2, further comprising determining an estimated average carrier to interference-noise ratio (CINR) for user u as $$CINR_u = \frac{1}{T} \sum_{t=1}^{T} CINR_{t,u}$$

where $CINR_{t,u}$ is the CINR for tile t of user u, and T is the total number of tiles, wherein outputting at least one value derived from the carrier signal power S and interference noise NI to facilitate adaptation of the wireless communication system comprises outputting the estimated average carrier to interference-noise ratio.

4. A method in accordance with claim 1, further comprising determining the received signal strength indicator (RSSI) as RSSI=S+NI, wherein outputting at least one value derived from the carrier signal power S and interference noise NI to facilitate adaptation of the wireless communication system comprises outputting the received signal strength indicator (RSSI).

5. A method in accordance with claim 1, further comprising:
    determining the transfer function matrix, H, dependent upon pilot tone values and corresponding received signal components; and determining the equalization matrix, $W^H$, of the equalizer from the transfer function matrix, H, and the estimate of the variance $\sigma^2$ of the noise at the receiving antennas.

6. A method in accordance with claim 5, wherein the elements of the transfer function matrix H are determined as $$\hat{H}_{a,u} = \frac{1}{2}\left(\frac{Y_a^{u,1}}{P_{u,1}} + \frac{Y_a^{u,2}}{P_{u,2}}\right),$$

where $Y_a^{u,s}$ denotes the received signal from antenna a for pilot s in PUSC (partial usage sub-channel) tile pattern u and $P_{u,s}$ denotes the pilot s in PUSC tile pattern u.

7. A method in accordance with claim 5, wherein the equalization matrix, $W^H$, is determined as $W^H = (H^H H + \sigma^2 I)^{-1} H^H$.

8. A method in accordance with claim 1, wherein the power S of the carrier signal at the output of the equalizer for user u is determined as $$S = |[W^H H]_{u,u}|^2 \sigma_X^2 = \left|\sum_{m=1}^{M} w_{m,u}^* H_{m,u}\right|^2 \sigma_X^2,$$

where $w_{m,u}$ is the element in row m and column u of the matrix W, $H_{m,u}$ is the element in row m and column u of the matrix H, and M is the number of receiving antennas.

9. A method in accordance with claim 1, wherein the variance $\sigma_I^2$ of the interference at the output of the equalizer for user u due to the signal from user v is determined as $$\sigma_I^2 = |[W^H H]_{u,v}|^2 \sigma_X^2 = \left|\sum_{m=1}^{M} w_{m,u}^* H_{m,v}\right|^2 \sigma_X^2,$$

where $w_{m,u}$ is the element in row m and column u of the matrix W, $H_{m,u}$ is the element in row m and column u of the matrix H, M is the number of receiving antennas and u is not equal to v.

10. A method in accordance with claim 1, wherein the variance, $\sigma_Z^2$, of the noise at the equalizer output for user u is determined as $$\sigma_Z^2 = \sum_{m=1}^{M} |w_{m,u}|^2 \sigma_m^2,$$

where $w_{m,u}$ is the element in row m and column u of the matrix W, M is the number of receiving antennas, and $\sigma_m^2$ is the variance of the noise at the $m^{th}$ receiving antenna.

11. A method in accordance with claim 1, further comprising determining an estimated average signal power $$S_u = \frac{1}{T}\sum_{t=1}^{T} S_{t,u}$$

and average power of interference plus noise $$NI_u = \frac{1}{T}\sum_{t=1}^{T} NI_{t,u}$$

for user u, where $S_{t,u}$ is signal power of user u within tile t, calculated as above, and $NI_{t,u}$ is interference from all other users plus total noise for user u within tile t.

12. An apparatus for generating an estimate of a carrier to interference-noise ratio (CINR) in a wireless communication system, the wireless communication system comprising a plurality of transmitting antennas, a plurality of receiving antennas and an equalizer with equalization matrix, $W^H$, operable to equalize signals from the plurality of receiving antennas, the apparatus comprising:

a first processing unit operable to produce an estimate, S, of a power of a carrier signal at the output of the equalizer dependent upon the equalization matrix, $W^H$, a transfer function matrix, H, between the plurality of transmitting antennas and the plurality of receiving antennas, and a variance $\sigma_X^2$ of a transmitted signal and further operable to produce an estimate, $\sigma_I^2$, of the variance of the interference at the output of the equalizer dependent upon the equalization matrix, $W^H$, the transfer function matrix, H, and the variance $\sigma_X^2$ of the transmitted signal;

a second processing unit operable to generate an estimate, $\sigma_Z^2$, of the variance of the noise at the output of the equalizer dependent upon the equalization matrix, $W^H$, and an estimate of a variance $\sigma^2$ of the noise at the receiving antennas;

a summing unit operable to sum the estimate, $\sigma_I^2$, of the variance of the interference and the estimate, $\sigma_Z^2$, of the variance of the noise at the output of the equalizer; and a division unit operable to produce the CINR by dividing the estimate, S, of the power of the signal at the output of the equalizer by the sum of the estimate, $\sigma_I^2$, of the variance of the interference and the estimate, $\sigma_Z^2$, of the variance of the noise at the output of the equalizer.

13. An apparatus in accordance with claim 12, wherein the first processing unit, the second processing unit, the summing unit and the division unit are implemented on a programmed processor.

14. An apparatus in accordance with claim 12, further comprising:

a third processing unit operable to receive pilot tone symbols and corresponding sub-channel components from the plurality of receiving antennas and operable to generate, therefrom, the transfer function matrix, H, between the plurality of transmitting antennas and the plurality of receiving antennas;

a fourth processing unit operable to receive sub-channel components corresponding to null symbols from the plurality of receiving antennas and operable to generate, therefrom, the antennas noise variance estimate, $\sigma^2$; and a fifth processing unit, coupled to the third and fourth processing units, and operable to generate the equalization matrix, $W^H$, based on the transfer function matrix, H and the antennas noise variance estimate, $\sigma^2$.

15. An apparatus in accordance with claim 14, further comprising a Fourier transform unit, coupled to inputs of the third and fourth processing unit and operable to determine sub-channel components of signals from the plurality of receiving antennas.

16. An apparatus in accordance with claim 14, wherein the third processing unit, the fourth processing unit and the fifth processing unit are implemented on a programmed processor.

17. An apparatus in accordance with claim 14, wherein the apparatus is integrated in a base station of the wireless communication system.

18. An apparatus in accordance with claim 17, wherein the plurality of transmitting antennas correspond to a plurality of users of the wireless communication system.

19. An apparatus in accordance with claim 17, wherein the plurality of transmitting antennas correspond to a single user of the wireless communication system.

20. An apparatus in accordance with claim 14, wherein the apparatus is integrated in a mobile subscriber station of the wireless communication system.

* * * * *